United States Patent
Fuhrmann et al.

(10) Patent No.: US 10,703,265 B2
(45) Date of Patent: Jul. 7, 2020

(54) LIGHTING MODULE FOR ILLUMINATING THE VEHICLE INTERIOR OF A MOTOR VEHICLE

(71) Applicant: DAIMLER AG, Stuttgart (DE)

(72) Inventors: Daniel Fuhrmann, Böblingen (DE); Daniela Knapp, Sindelfingen (DE); Michael Holz, Senden (DE); Florian Staib, Rudersberg (DE); Timo Gramlich, Leinfelden-Echterdingen (DE); Thomas Kälberer, Weil der Stadt (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/617,066

(22) PCT Filed: May 25, 2018

(86) PCT No.: PCT/EP2018/063777
§ 371 (c)(1),
(2) Date: Nov. 26, 2019

(87) PCT Pub. No.: WO2018/219803
PCT Pub. Date: Dec. 6, 2018

(65) Prior Publication Data
US 2020/0114817 A1 Apr. 16, 2020

(30) Foreign Application Priority Data

May 30, 2017 (DE) .................. 10 2017 005 126

(51) Int. Cl.
*B60Q 3/80* (2017.01)
*B60K 37/06* (2006.01)

(52) U.S. Cl.
CPC ............... *B60Q 3/80* (2017.02); *B60K 37/06* (2013.01); *B60K 2370/122* (2019.05);
(Continued)

(58) Field of Classification Search
CPC ........ H05B 45/00; H05B 45/10; H05B 47/10; B60Q 3/80; B60K 37/06; B06K 2370/122;
(Continued)

(56) References Cited

U.S. PATENT DOCUMENTS 9,522,631 B2  12/2016  Kleinert et al.
2005/0280524 A1  12/2005  Boone et al.
(Continued)

FOREIGN PATENT DOCUMENTS

DE  102004061417 A1  7/2006
DE  102012010044 A1  11/2013
(Continued)

OTHER PUBLICATIONS

Examination Report created dated Jan. 30, 2018 in related/corresponding DE Application No. 10 2017 005 126.7.
(Continued)

*Primary Examiner* — Jimmy T Vu
(74) *Attorney, Agent, or Firm* — Patent Portfolio Builders PLLC

(57) ABSTRACT

A lighting device for illuminating the vehicle interior of a motor vehicle is provided. The motor vehicle includes a plurality of light sources for illuminating the vehicle interior and a control device that can be used to actuate the plurality of light sources independently of one another. The motor vehicle further has an operator control device connected to the control device and includes segments and operator control elements that can be used to actuate the light sources independently of one another by a user. A display unit displays at least a partial image of the vehicle interior that can be illuminated or is illuminated by the controllable light sources.

12 Claims, 1 Drawing Sheet

Figure 1:
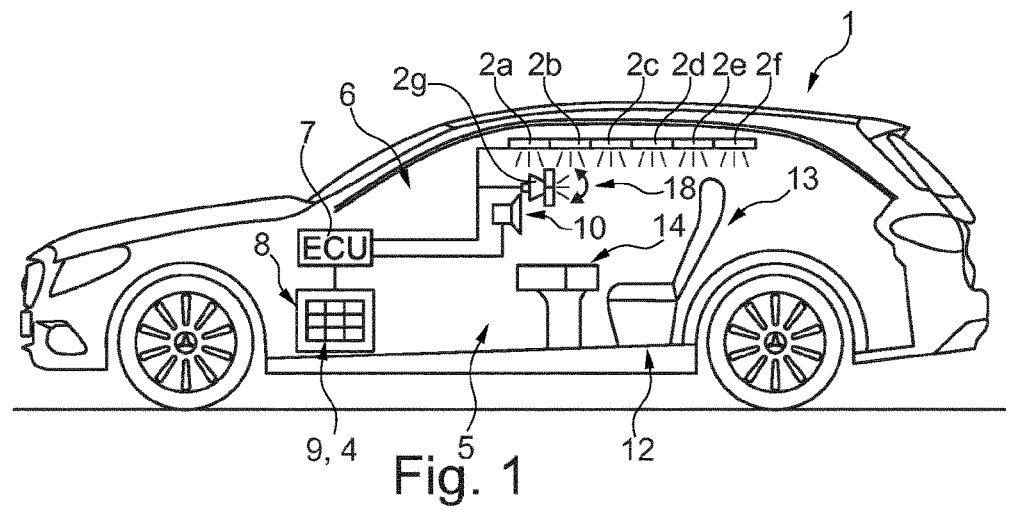

(52) U.S. Cl.
CPC ............. *B60K 2370/1526* (2019.05); *B60K 2370/171* (2019.05); *B60K 2370/21* (2019.05); *B60K 2370/33* (2019.05); *B60K 2370/331* (2019.05); *B60K 2370/349* (2019.05); *B60K 2370/736* (2019.05); *B60K 2370/739* (2019.05)

(58) Field of Classification Search
CPC ........ B06K 2370/349; B06K 2370/331; B06K 2370/736; B06K 2370/1526; B06K 2370/21; B06K 2370/739
See application file for complete search history.

(56) References Cited

U.S. PATENT DOCUMENTS

| | | | |
|---|---|---|---|
| 2008/0212215 A1* | 9/2008 | Schofield | B60R 11/04 359/844 |
| 2008/0297726 A1 | 12/2008 | Rodriguez, Jr. et al. | |
| 2009/0018709 A1 | 1/2009 | Hellwig et al. | |
| 2013/0120238 A1 | 5/2013 | Spaulding et al. | |
| 2014/0265934 A1 | 9/2014 | Ramey | |
| 2015/0100203 A1 | 4/2015 | Tai et al. | |
| 2015/0301664 A1 | 10/2015 | Tsai et al. | |
| 2016/0062327 A1* | 3/2016 | Fagan | B64D 11/00153 700/83 |
| 2016/0078593 A1 | 3/2016 | Havilio | |

FOREIGN PATENT DOCUMENTS

| | | |
|---|---|---|
| DE | 102013009063 A1 | 12/2014 |
| DE | 102014215329 A1 | 2/2016 |
| DE | 102015118092 A1 | 5/2016 |
| DE | 202015001767 U1 | 6/2016 |
| DE | 102015011891 A1 | 1/2017 |
| EP | 2172366 A1 | 4/2010 |
| EP | 2709427 A2 | 3/2014 |
| EP | 2982541 A2 | 2/2016 |

OTHER PUBLICATIONS

International Search Report dated Aug. 31, 2018 in related/corresponding International Application No. PCT/EP2018/063777.
Written Opinion dated Aug. 31, 2018 in related/corresponding International Application No. PCT/EP2018/063777.
International Search Report dated Aug. 1, 2017 in International Application No. PCT/EP2017/000453.
Search Report created dated Mar. 21, 2017 in DE Application No. 10 2016 005 255.4.
Written Opinion dated Aug. 1, 2017 in related International Application No. PCT/EP2017/000453.
Office Action dated Dec. 9, 2019 in co-pending U.S. Appl. No. 16/096,912.
Applicant Reply filed Dec. 19, 2019, responsive to Office Action dated Dec. 9, 2019 in co-pending U.S. Appl. No. 16/096,912.
Final Office Action dated Apr. 7, 2020 in co-pending U.S. Appl. No. 16/096,912.
Applicant Reply filed Apr. 24, 2020, responsive to Office Action dated Apr. 7, 2020 in co-pending U.S. Appl. No. 16/096,912.

* cited by examiner

LIGHTING MODULE FOR ILLUMINATING THE VEHICLE INTERIOR OF A MOTOR VEHICLE

BACKGROUND AND SUMMARY OF THE INVENTION

Exemplary embodiments of the invention relate to a lighting device for lighting the vehicle interior of a motor vehicle and an operating device for a lighting device of this kind. Exemplary embodiments of the invention further relate to a motor vehicle comprising a lighting device of this kind. Finally, exemplary embodiments of the invention relate to a method for lighting the vehicle interior of a motor vehicle.

Interior lighting for motor vehicles, the lighting features of which can be adapted to different environmental parameters, is generally known as "adaptive interior lighting".

Against this backdrop, DE 10 2015 011 891 A1 discloses a method for adjusting interior lighting in a vehicle. The interior lighting is formed by variable, separate control of a lighting unit comprising a plurality of light sources. A light range of the interior lighting thereby approximately extends over the entire width of the vehicle. In this manner it is possible to achieve interior lighting by means of the light sources, as well as a reading light.

DE 10 2013 009 063 A1 describes a method for controlling the light emission of interior lighting for a vehicle in which a partial region of a vehicle interior is shown on a display unit. By means of the operating device, the light emission of the interior lighting can be changed by the user.

DE 10 2015 118 092 A1 discloses a vehicle having a controller that shows information on a display screen relating to the locking state of a door of the vehicle and to a safety belt installed in the vehicle.

DE 10 2004 061 417 A1 discloses an operating system of a vehicle. The operating system comprises a screen display, in which a menu structure can be shown, via which different vehicle functions can be controlled. The menu structure thereby also allows inner lighting of the motor vehicle to be controlled.

Exemplary embodiments of the present invention are directed to novel ways of developing lighting devices for lighting the vehicle interior of a motor vehicle.

The basic concept of the invention is to equip a lighting device, for lighting the vehicle interior of a motor vehicle, with an operating device, for controlling the light sources of the lighting device independently of one another, and with a display unit that displays a partial image of the vehicle interior lit by the controllable light sources. The display unit preferably comprises a touch-sensitive display. In this manner the operation of the individual light sources of the lighting device is made easier for the user of the lighting device—typically the driver or passenger of the motor vehicle. This allows comfortable operation of the lighting device, even when the device comprises a plurality of light sources which are controlled independently of one another.

A lighting device according to the invention for lighting the vehicle interior of a motor vehicle comprises a plurality of light sources and a control device, by means of which at least two of the light sources, preferably a plurality of the light sources, particularly preferably all of the light sources, can be controlled independently of one another. In addition, the lighting device comprises an operating device connected to the control device and comprising operating elements, by means of which the light sources can be controlled independently of one another by a user. The operating device also comprises a display unit that displays at least one partial image of the vehicle interior which is or can be lit by the controllable light sources. In the present case, "partial image" means an image-like representation of at least one region of the vehicle interior that can be lit by the controllable light sources. A partial image of this kind can be a live image generated by a camera or a still image of the region. An image of this kind can be modified by means of image processing methods before being displayed, or can be displayed in an unchanged form, i.e., as recorded.

According to a preferred embodiment, a rear region of the vehicle interior, preferably both a left-hand and a right-hand zone of the rear region, is shown in the partial image, which region can be lit by at least one of the light sources. The lighting of the rear region can therefore be controlled by means of the operating device. The lighting of the left-hand and right-hand zones of the rear region can preferably be actuated independently of one another.

The light sources and the partial image of the vehicle interior that is shown in the display unit are expediently coordinated to one another such that the lighting of the rear region shown in the partial image can be changed by actuating at least one operating element.

According to a preferred embodiment, the partial image displayed by the display unit or the touch-sensitive display is a live image of the vehicle interior recorded by means of a camera installed in the vehicle interior of the motor vehicle. If the lighting of the vehicle interior is changed by correspondingly controlling the light sources via the control device and, in connection therewith, via the operating elements of the operating device, the changed lighting is immediately displayed in the live image. In the case that the operating device is arranged, for example, in the center console (not shown) of the motor vehicle, and the rear region of the vehicle interior is recorded by means of the camera, the driver receives current information about the lighting state of the rear region by means of the operating device in the center console.

In an alternative embodiment the partial image is a predefined image, in particular a graphic, which is stored in an image memory of the control device or in the operating device. This image can also have been recorded by a camera. Since, in this embodiment, the image is not a live image, but preferably a graphic, it is not necessary to provide a camera or other suitable means of recording an image.

According to a different preferred embodiment, the operating elements are designed as keys that can be operated by the user and are preferably arranged in a grid to form a keypad. This variant has proven to be particularly cost-effective, since the desired functionality, specifically the control of the light sources by the user, can also be achieved without providing a relatively costly touch-sensitive display.

The individual light sources can expediently form an array of LEDs and/or comprise an array of LEDs.

At least one light source is preferably designed such that the brightness and/or light color and/or lighting angle thereof can be varied by the operating device.

Exemplary embodiments of the invention also relate to an operating device for controlling a lighting device for a rear region of a vehicle interior of a motor vehicle. In particular, the lighting device can be the previously specified lighting device. The operating device comprises a plurality of operating elements and a display unit, which together create a touch-sensitive display. In at least one display zone in the display, at least one image of the rear region is displayed. According to the invention, the at least one image is, in each case, divided into a plurality of segments. By actuating one or more of the segments, the user can select which zone of the rear region should be lit, or, in the case that the lighting is already activated, in which region the lighting should be changed by corresponding subsequent control of the operating device. According to the invention at least one operating element is provided, by means of which a predetermined lighting program can be selected. In this manner, the selected lighting program is shown, i.e., simulated, in the display. Before activating the selected lighting program, the user can therefore decide whether the program actually corresponds to the desired lighting scenario.

According to a preferred embodiment, an image of a left-hand zone of the rear region is displayed in a left-hand display zone in the display. An image of a right-hand zone of the rear region is displayed in a right-hand display zone. The left-hand and right-hand rear region can therefore be controlled separately, i.e., independently of one another.

According to a preferred embodiment, at least one operating element is provided in the touch-sensitive display, by means of actuating which element at least one lighting parameter can be adjusted. The parameter can be, in particular, the brightness and/or the light color of the light generated by the light sources.

In a particularly preferred embodiment, at least one operating element is shown in the display as an actuatable slide control. At least one lighting parameter, in particular the brightness and/or the light color of the light generated by the light sources, can be altered by means of the slide control.

At least one operating element can therefore expediently be formed as an activation element, by means of which the selected lighting program is activated in the operating device. The term "activation" means that the selected lighting program is implemented in the vehicle interior by means of the lighting device.

Exemplary embodiments of the invention also relate to a motor vehicle comprising a vehicle interior in which a previously specified lighting device and/or a previously specified operating device are provided. The previously explained advantages of the lighting device and operating device therefore also apply to the motor vehicle according to the invention.

Exemplary embodiments of the invention also relate to a method for lighting the vehicle interior of a motor vehicle, in particular of the previously specified motor vehicle. According to the method, at least two light sources, preferably a plurality of light sources, particularly preferably all of the light sources, of the lighting device for lighting the vehicle interior are controlled independently of one another by means of a plurality of operating elements. According to the method, at least one partial image of the vehicle interior, which can be or is lit by the controllable light sources, is displayed by means of a display unit provided in the vehicle interior.

Additional important features and advantages of the invention can be found in the drawings and the associated description of the drawings, with reference to the drawings.

It is self-evident that the aforementioned features and the following features, which are yet to be explained, cannot only be used in the relevant given combination, but can also be used in other combinations or in isolation, without departing from the scope of the present invention. Preferred embodiments of the invention are shown in the drawings and are explained in greater detail in the following description.

BRIEF DESCRIPTION OF THE DRAWING FIGURES

Figure 2:
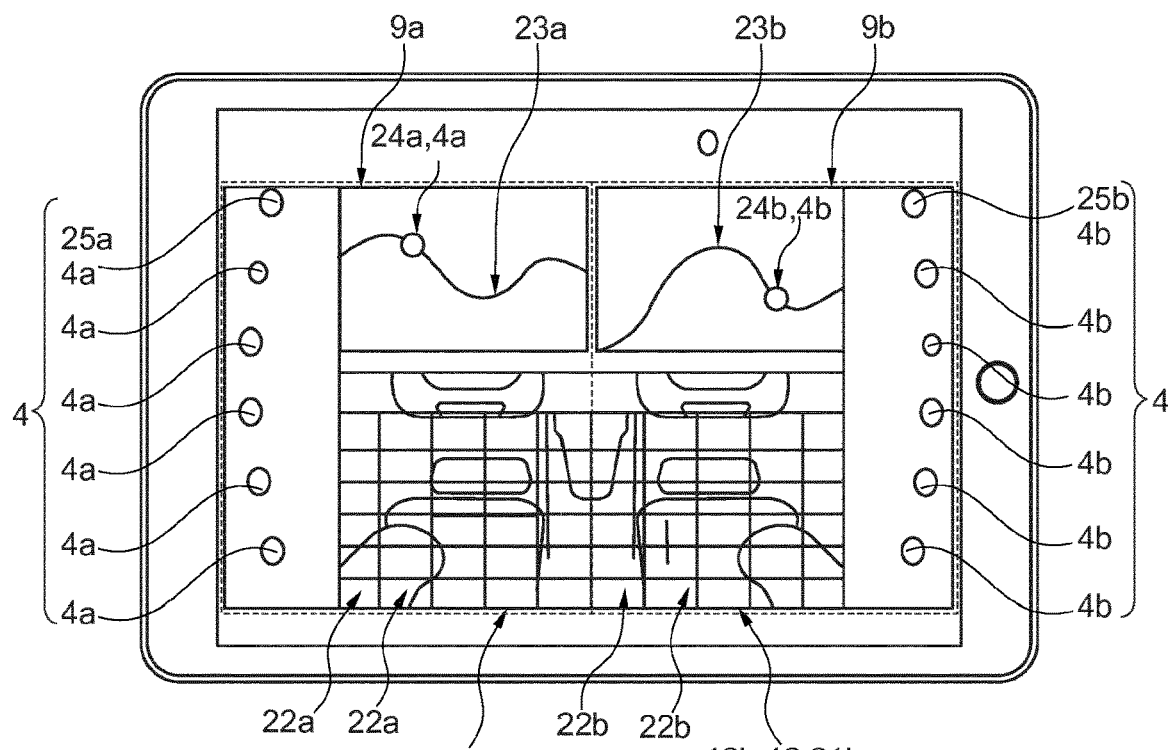
Figure 3:
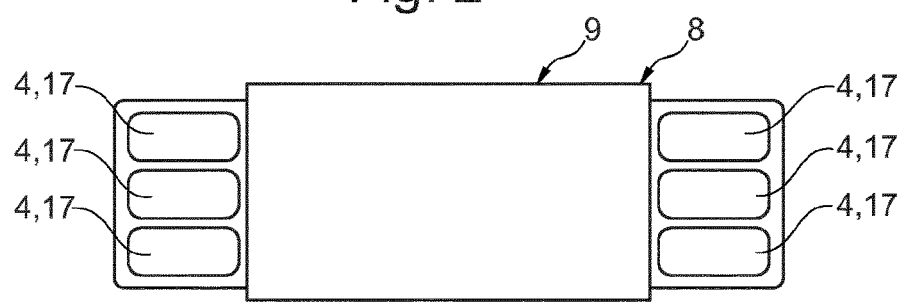

The drawings show, in each case schematically:

FIG. 1 an example of a motor vehicle according to the invention, comprising a lighting device according to the invention, FIG. 2 an example of an operating device for operating the lighting device, which has a touch-sensitive display for this purpose, FIG. 3. a variant of the operating device of FIG. 2, in which, instead of a touch-sensitive display, a conventional non-touch-sensitive display and operating elements in the form of a keypad comprising a plurality of keys are used.

DETAILED DESCRIPTION

FIG. 1 schematically shows an example of a motor vehicle 1 according to the invention. A lighting device 6 is provided in a vehicle interior 5 of the motor vehicle 1, by means of which lighting device the vehicle interior 5 can be lit. The lighting device 6 comprises a plurality of light sources 2a-2g for lighting the vehicle interior 5, and a control device 7 that is connected to the light sources 2a-2g. The light sources 2a-2g are used, in particular, to light a rear region 12 of the vehicle interior 5, which region comprises two rear seats 13 and two trays 14. The light sources 2a-2g can thereby be controlled independently of one another by means of the control device 7. As is indicated in FIG. 1 by way of example for the light sources 2a-2g, the light sources can be formed by LEDs arranged in the vehicle interior 5 as an LED array. It is self-evident that other kinds of suitable light means can also be used in variants. It is also possible to provide light sources 2a-2g of which the arrangement differs from the geometry of an array.

The lighting device 6 also comprises an operating device 8 communicatively connected to the control device 7. The light sources 2a-2g can be controlled and therefore operated by the user by means of the operating device 8 via the control device 7. Individual light sources 2a-2g can be selected and activated using the individual segments 22a, 22b. As a result, in the rear region of the vehicle it is possible to specifically select zones that are to be lit. A camera 10 is also arranged in the vehicle interior 5. In the example of the drawings, the camera 10 is designed such that it generates a live image of a left-hand and right-hand zone 12a, 12b of the rear region 12.

Independently of the kind of light means used, the light sources 2a-2g are designed such that the brightness and/or the light color of the light emitted can be varied by means of the operating device 8. In addition, the light sources 2a-2g can also be designed such that the lighting angle of the light sources 2a-2g can be varied. This is indicated in FIG. 1 by way of example for the light source denoted by the reference sign 2g. The adjustability of the light source 2g is indicated in FIG. 1 by a double arrow denoted by the reference sign 18.

FIG. 2 separately and schematically shows the operating device 8. As illustrated, the operating device 8 is designed as a touch-sensitive display 9 comprising a plurality of operating elements 4. The operating elements 4 can be integrated into the touch-sensitive display or be separate keys. In the display 9, a left-hand display zone 9a is allocated to a left-hand zone 12a of the rear region 12. A right-hand display zone 9b is allocated to a right-hand zone 12b of the rear region 12. An image 21a of the left-hand zone 12a of the rear region 12 is displayed in the left-hand display zone 9a. Correspondingly, an image 21b of the right-hand zone 12b of the rear region 12 is displayed in the right-hand display zone 12b. These images 21a, 21b can be live images which are recorded by the camera 10.

A plurality of operating elements 4a are arranged on the left-hand edge of the left-hand display zone 9a, according to FIG. 2, by means of which elements different lighting parameters, such as the brightness or the color of the light, can be adjusted for the left-hand zone 12a of the rear region 12. However, it is also conceivable to select different, preset lighting programs having light colors and brightness levels assigned to each program. Correspondingly, a plurality of operating elements 4b are arranged on the right-hand edge of the right-hand display zone 9b, by means of which elements different lighting parameters, such as the brightness or the color of the light, can be adjusted for the left-hand zone 12a of the rear region 12. Lighting programs, for example, "work", "mood", "incident lighting", "reading", etc., for the left-hand and right-hand zones 12, 12b are also conceivable. In this case it is also conceivable to select different, preset lighting programs having light colors and brightness levels assigned to each program. By arranging the operating elements 4a, 4b on the left-hand or right-hand edge, the clarity is improved and the operation of the elements is therefore simplified.

The images 21, 21a of the rear region 12 shown in the left-hand and right-hand display zones 9a, 9b are each divided into a plurality of segments 22a, 22b. By touching a particular segment 22a in the left-hand display zone 9a, the user can determine which region of the left-hand zone 12a should be lit, or, in the case that the lighting is already activated, in which zone the lighting should be changed by means of the light sources 2a-2g by a subsequent actuation of a relevant operating element 4a. A plurality of segments 22a can also be selected by the user. Correspondingly, by touching a particular segment 22b in the right-hand display zone 9b, the user can determine in which region of the right-hand zone 12b the lighting should be changed by a subsequent actuation of a relevant operating element 4b. A plurality of segments 22b can also be selected by the user. Depending on the selected segment 22a or 22b and the selected operating element 4a or 4b, the control/regulation device 7 controls the light sources 2a-2g such that the lighting effect desired by the user and selected by means of the operating elements 4a, 4b is implemented in the left-hand or right-hand zone.

The lighting program selected by the user is first shown as a simulated image 21a or 21b in the relevant display zone 9a, 9b. The user can therefore check whether the simulated lighting program corresponds to the desired scenario, without it being necessary to actually change the lighting of the rear region 12 for this purpose. A plurality of lighting programs can therefore be "tried out" by the user before the actual activation.

One of the operating elements 4a, 4b shown in the display 9 is designed as an activation element 25a or 25b. By actuating the related activation element 25a or 25b, the lighting program selected by the user is activated. This means that the lighting device 6 is controlled by the control device 7 such that the light sources 2a-2g implement the relevant lighting program. The left-hand or right-hand rear region 12a, 12b is then lit by the light sources 2aa-2g in accordance with the selected lighting program.

In order to improve the operability, one of the operating elements 4a, 4b can be a slide control 24a or 24b which is shown in the left-hand or right-hand display zone 9a, 9b and can be actuated by the user. By actuating the slide control 24a, 24b, a lighting parameter, in particular the brightness and the light color of the light generated by the light sources 2a-2g, can be adjusted.

If there is no camera 10 available in the vehicle interior 5, a predefined image, in particular in the form of a graphic, can be shown in the display 9, which image can be stored in an image memory provided in the control device 7 or in the operating device 8. The predefined image can self-evidently also be recorded by means of a suitable camera.

In a simplified variant, a non-touch-sensitive display 9 can also be used instead of a touch-sensitive display 9, as is shown roughly schematically in FIG. 3. In this scenario, keys 17, which can be operated by the user of the operating device 8, are used as the operating elements 4, which keys can be arranged at the side of the display 9, for example.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A lighting device configured to light a vehicle interior of a motor vehicle, the lighting device comprising:
    a plurality of light sources configured to light the vehicle interior;
    a control device configured to control at least two of the light sources independently of one another;
    an operating device connected to the control device and comprising operating elements configured to receiver a user input to control the at least two light sources independently of one another by a user,
    wherein the operating device comprises a display unit that displays a partial image of the vehicle interior that is lit by the plurality of light sources, wherein the display unit comprises selectable segments corresponding to zones of the vehicle interior that are to be lit,
    wherein the operating device is configured such that a lighting program selected by the user via one of the operating elements is shown as a simulated image or in a relevant display zone of the display unit,
    wherein the display unit is a touch-sensitive display, and
    wherein the partial image displayed by the display unit is a live image of the vehicle interior recorded by a camera installed in the vehicle interior of the motor vehicle.

2. The lighting device of claim 1, wherein a left-hand zone and a right-hand zone of a rear region of the vehicle interior is shown in the partial image, wherein the rear region is lit by at least one of the plurality of light sources.

3. The lighting device of claim 2, wherein
    the plurality of light sources and the partial image of the rear region that is shown in the display unit are coordinated to one another such that the lighting of the rear region shown in the partial image is adjustable by actuating at least one of the operating elements, a segment of the partial image is assigned by one of the operating elements, the lighting of which is varied by actuating one of the operating elements.

4. The lighting device of claim 1, wherein the partial image displayed by the display unit is a graphic stored in an image memory of the control device or the operating device.

5. The lighting device of claim 1, wherein the display unit and the operating elements of the operating device are part of the touch-sensitive display.

6. The lighting device of claim 1, wherein at least one of the plurality of light sources is configured such that brightness, light color, or lighting angle of the at least one of the plurality of light sources is varied by the operating device.

7. An operating device configured to control a lighting device of a motor vehicle, the operating device comprising:
a plurality of operating elements; and
a display unit, which is a touch-sensitive display,
wherein at least one image of a rear region of an interior of the motor vehicle is displayed on the display unit in at least one display zone,
wherein the at least one image is divided into a plurality of actuatable segments, each of the plurality of actuatable segments being configured so that, a user actuating one or more of the plurality of actuatable segments, selects which zone of the rear region is to be lit or in which zone the lighting should be changed by the lighting device,
wherein at least one operating element of the plurality of operating elements is configured to allow the user to select a preset lighting program that is shown and simulated on the display unit,
wherein the at least one display zone includes left-hand and right-hand display zones, an image of a left-hand zone of the rear region is displayed in the left-hand display zone in the display unit, and an image of a right-hand zone of the rear region is displayed in the right-hand display zone of the display unit.

8. The operating device of claim 7, wherein at least one operating element of the plurality of operating elements is provided in the touch-sensitive display, the at least one operating element configured such that actuation of the at least one operating element adjusts brightness or light color of light to be generated by light sources of the lighting device.

9. The operating device of claim 7, wherein at least one operating element of the plurality of operating elements is displayed as an actuatable slide control that is configured to adjust a brightness or the light color of light generated by light sources of the lighting device.

10. The operating device of claim 7, wherein at least one operating element of the plurality of operating elements is an activation element configured to activate the selected preset lighting program in the lighting device.

11. A motor vehicle, comprising:
a vehicle interior;
a lighting device configured to light the vehicle interior, wherein the lighting device comprises
a plurality of light sources configured to light the vehicle interior;
a control device configured to control at least two of the light sources independently of one another;
an operating device connected to the control device and comprising operating elements configured to receiver a user input to control the at least two light sources independently of one another by a user,
wherein the operating device comprises a display unit that displays a partial image of the vehicle interior that is lit by the plurality of light sources, wherein the display unit comprises selectable segments corresponding to zones of the vehicle interior that are to be lit,
wherein the operating device is configured such that a lighting program selected by the user via one of the operating elements is shown as a simulated image or in a relevant display zone of the display unit,
wherein the display unit is a touch-sensitive display, and
wherein the partial image displayed by the display unit is a live image of the vehicle interior recorded by a camera installed in the vehicle interior of the motor vehicle.

12. A method for lighting a vehicle interior of a motor vehicle, the method comprising:
controlling, according to one or more actuated segments of a plurality of actuatable segments in an image displayed on a touch-sensitive display and according to actuation of one or more operating elements, at least two light sources of a plurality of light sources of a lighting device configured to light the vehicle interior;
determining, based on the one or more actuated segments, a zone of the vehicle interior that is to be lit;
adjusting, using the one or more operating elements, a lighting parameter of at least one of the at least two light sources;
displaying, on the touch-sensitive display, at least one partial image of the vehicle interior that is lit by the plurality of light sources,
wherein a lighting program selected by a user via the one or more operating elements is first shown as a simulated image in a relevant display zone of the touch-sensitive display, and
wherein the at least one display zone includes left-hand and right-hand display zones, an image of a left-hand zone of the rear region is displayed in the left-hand display zone in the display unit, and an image of a right-hand zone of the rear region is displayed in the right-hand display zone of the display unit.

* * * * *